Nov. 15, 1955     P. F. DANEL     2,723,680

CONDUIT ELEMENTS

Filed June 26, 1951

INVENTOR.

Pierre F. Danel

BY George H. Corey

ATTORNEY

United States Patent Office 2,723,680
Patented Nov. 15, 1955

2,723,680

CONDUIT ELEMENTS

Pierre Francois Danel, Grenoble, France, assignor to Etablissements Neyrpic, Grenoble, France, a corporation of France Application June 26, 1951, Serial No. 233,521

Claims priority, application France July 1, 1950

9 Claims. (Cl. 137—561)

This invention relates to conduit elements which produce a change in the direction of flow through them, for example, elbows and branch connections.

As a general rule, all changes of the direction of flow through a conduit produce losses of head. Even though these losses of head may in some cases be small, they are always accompanied by a disturbance of the flow (such as increased turbulence or distortion of the velocity distribution), which disturbance may be prejudicial to the proper function of the apparatus.

It has been suggested that the effect of these undesirable phenomena may be reduced by making each element which changes the direction of flow slightly convergent. In the case of a branching conduit, this means that the total cross-sectional area at the inlet must be greater than the total cross-sectional area of the outlets. It is not usually possible to take advantage of the improvements offered by the use of such convergence, because either the outlet sections must be made too small, resulting in an undesirable loss of head in the downstream pipes, or the upstream pipe sections must be made too large, with resulting increased cost.

In accordance with the present invention, these difficulties may be avoided by providing, either upstream or downstream from each convergent branch connection or elbow, a straight, divergent conduit element having an angle of divergence less than approximately 10°.

The present invention is essentially different from a common expedient which is used where it is desired to introduce into a hydraulic conduit an apparatus which has little or no loss of head in itself, but whose cost increases rapidly with increasing diameter. This expedient consists in placing a convergent section of pipe ahead of the apparatus in question and a divergent section of pipe downstream from it. In that manner it is possible to use an apparatus of smaller diameter. This expedient is particularly common in the case of spherical cut-off valves.

The present invention relates to conduit sections which produce changes of the direction of flow by means of elements which create either a substantial loss of head or a substantial disturbance of flow. The invention consists in giving to these elements a certain convergence which improves the hydraulic flow conditions through them, as is well known, and in also providing upstream or downstream from each such element a divergent conduit element of suitable dimensions.

As used in this specification, the terms "convergent" and "divergent" as used with reference to a conduit element, mean that the element is convergent or divergent in the direction of flow.

The attached drawings illustrate two examples of the invention. These examples are given by way of illustration and not by way of limitation.

Figure 1:
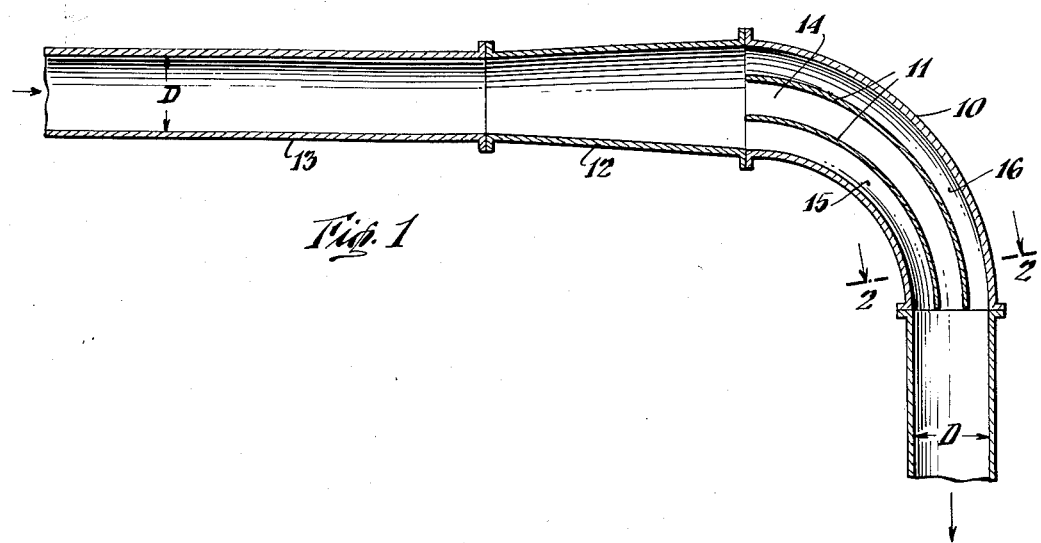
Fig. 1 is a sectional view of a conduit provided with an elbow constructed in accordance with the invention.
Figure 2:
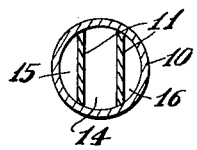
Fig. 2 is a cross-sectional view taken on the line 2—2 of Fig. 1.

Fig. 1 shows a convergent elbow 10 having guide vanes 11 extending across the elbow and substantially concentric about the center of curvature of the elbow. Immediately upstream from the elbow 10 is placed a divergent straight conduit element 12. This assembly, including the elbow 10 and the divergent element 12 is placed in a conduit 13 having a diameter D, which is the same as the diameter of the upstream end of element 12 and the downstream end of elbow 10.

A divergent section of a conduit, even though it has a small angle of divergence, will produce a certain disturbance of the flow, since it modifies the distribution of velocity. However, in the apparatus shown, this small disturbance is more than compensated by the improvement in the flow within the elbow due to the convergence of the elbow.

Where a divergent section of a conduit discharges into a conduit which has no tendency to produce uniform velocities of the different liquid particles, then those particles of liquid nearest the walls are greatly retarded, and the divergence must be very weak in order to avoid separation of the fluid stream from the walls and the creation of eddies.

The guide vanes 11 within the elbow 10 immediately downstream from the divergent section 12 produce a further improvement in the flow through the latter. The convergence of the elbow cooperates with the guide vanes to create a tendency to make the velocity distribution uniform at the outlet of the divergent section. In effect, the central channel 14 between the guide vanes 11, because of the presence of the divergent section upstream, flows with a speed greater than the speeds in the lateral channels 15 and 16, and it acts on the two lateral channels in a manner similar to an ejector. There is thereby produced an increase in the velocity within the lateral channels, and consequently a reduction in pressure at the entrance of the lateral channels. This reduction in pressure tends to accelerate the liquid particles adjacent the walls of the divergent section.

The flow through the divergent section is thereby improved, and it is possible to choose a value for the divergent angle of that section greater than the limiting value generally adopted for smooth flow conditions in divergent sections.

This latter improvement does not occur when the divergent section is downstream from the elbow, so it is preferred to place the divergent section upstream from the elbow.

In the case of a penstock manifold for a hydroelectric or hydraulic station, the conventional structure includes a succession of T-connections leading to branch conduits. Each of the branch conduits supplies water to a hydraulic turbine. The different branch connections and an elbow feeding the last turbine are connected to one another by straight cylindrical pipe sections. For each T-connection, the inlet cross section equals the combined cross-sections of the two outlets.

Figure 3:
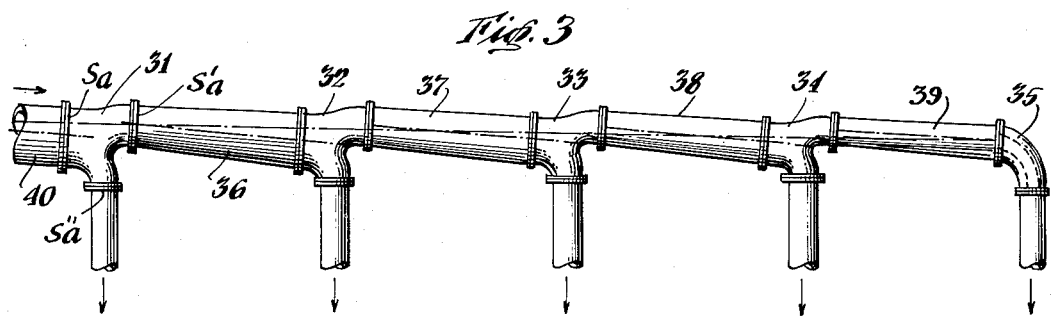
Fig. 3 is a plan view of a penstock manifold constructed in accordance with the invention.

Fig. 3 shows a penstock manifold for supplying water to a hydroelectric station constructed in accordance with the present invention. This manifold includes convergent branch connections 31, 32, 33 and 34 and an elbow 35 which is also convergent, each connected to the next by divergent pipe elements 36, 37, 38 and 39.

The cross-section of the inlet $S_a$ and the outlets $S'_a$ and $S''_a$ are such that:

$$S'_a + S''_a < S_a$$

It should be understood that in installations of this type, it is desirable to combine structures provided in accordance with the invention with branch connections which have good hydraulic characteristics themselves. For example, the branch connections shown in Fig. 3 are those of the type shown and claimed in U. S. Patent No. 2,533,720, dated December 12, 1950. That patent concerns branch connections where the ridge which separates the two branches is placed in the full current of the stream, that arrangement being obtained by the lateral displacement of the axes of both the downstream conduits with regard to that of the upstream conduit.

In the apparatus of Fig. 3, this displacement permits the arrangement of the axes of the supply pipe 40 and the divergent section 36, 37, 38, 39 at an angle with the overall center line of the manifold, which has the effect of reducing the magnitude of the change in direction between the manifold and each branch, and consequently reduces the loss of head in the apparatus. This is accomplished while maintaining the alignment of the several branch conduits in substantially the same manner as conventional penstock manifolds.

In Fig. 3, the convergent formation of each of the branch connections 31, 32, 33, 34 improves the flow conditions therein, and the succeeding divergent element restores the conduit downstream therefrom to its preferred diameter. The last divergent element 39 cooperates with both the branch connection 34 and the elbow 35. As pointed out above, in the case of a convergent branch connection, the divergent conduit element may be placed upstream from it with equal facility.

I claim:

1. A section of conduit for permanently changing the longitudinal direction of flow of fluid therethrough, comprising a convergent elbow in which the direction of flow of fluid is changed, said elbow including vanes extending thereacross and concentric with the center of curvature thereof, and a straight divergent conduit element connected immediately upstream from said elbow.

2. A branch connection for a conduit, comprising an inlet opening and at least two outlet openings, said connection having the sum of the cross-sectional areas of the outlet openings less than the cross-sectional area of the inlet opening, and a straight divergent conduit element connected immediately adjacent at least one of said openings.

3. A branch connection as defined in claim 2, in which said divergent element is located upstream from said inlet opening.

4. A branch connection as defined in claim 2, in which said divergent element is located downstream from one of said outlet openings.

5. A pipe manifold, comprising a main inlet pipe, a plurality of spaced outlet pipes, a plurality of convergent branch connections, one for each outlet pipe but the last, each branch connection having an inlet opening, a branch outlet opening connected to one of said outlet pipes, and a main outlet opening, a plurality of divergent conduit elements, one connected to each main outlet opening, the inlet opening of the first branch connection being connected to said main inlet pipe, the last outlet pipe being connected to the last divergent conduit element.

6. A pipe manifold as defined in claim 5, in which said branch connections have both their outlet axes laterally offset with respect to their inlet axis.

7. A pipe manifold as defined in claim 6, in which all said outlet pipes are parallel and all the main outlet axes of said branch connections are so offset that the axes of said divergent conduit elements extend at obtuse angles with respect to the respective outlet pipes located adjacent thereto and downstream therefrom.

8. A section of conduit for permanently changing the longitudinal direction of flow of fluid therethrough, comprising a convergent conduit element curved lengthwise thereof in which the direction of flow of fluid is changed and a straight divergent conduit element having an angle of divergence less than about 10° connected immediately adjacent one end of said convergent element.

9. A branch connection for a conduit, comprising an inlet opening and at least two outlet openings, said connection having the sum of the cross-sectional areas of the outlet openings less than the cross-sectional area of the inlet opening, and a straight divergent conduit element having an angle of divergence less than about 10° connected immediately adjacent at least one of said openings.

References Cited in the file of this patent

UNITED STATES PATENTS

| | | |
|---|---|---|
| 901,545 | Morrison | Oct. 20, 1908 |
| 1,215,451 | White | Feb. 13, 1917 |
| 1,827,727 | Blizard | Oct. 20, 1931 |
| 2,473,415 | Doull | June 14, 1949 |
| 2,533,720 | Danel | Dec. 12, 1950 |

FOREIGN PATENTS

| | | |
|---|---|---|
| 13,779 | Great Britain | Oct. 17, 1851 |
| 186,574 | Germany | June 7, 1906 |